Figure 1:
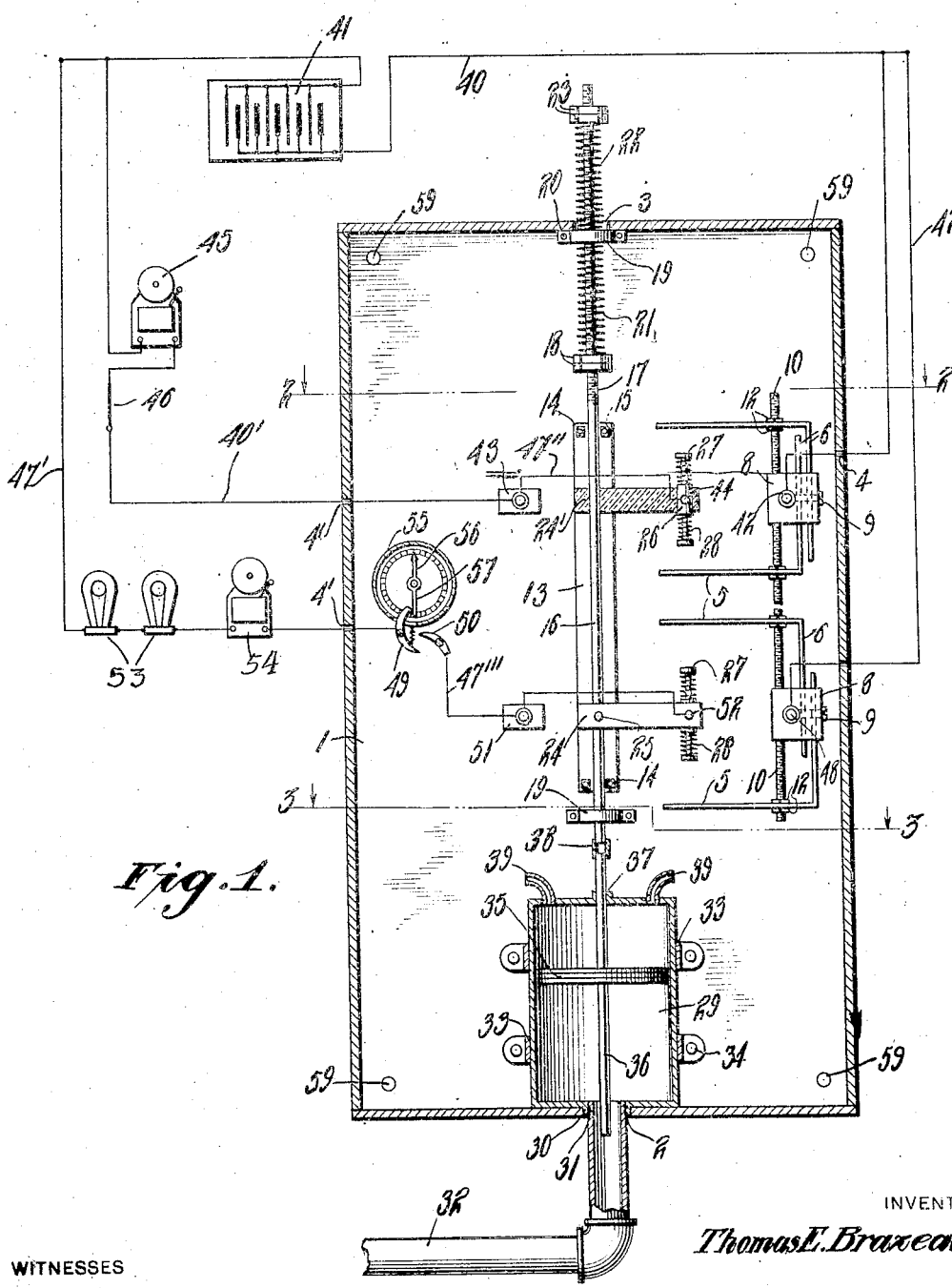

T. E. BRAZEAL.
FLUID PRESSURE CIRCUIT CLOSER.
APPLICATION FILED NOV. 27, 1916.

1,338,896.

Patented May 4, 1920.

INVENTOR
Thomas E. Brazeal

WITNESSES
W. C. Fielding
A. F. Kellogg

BY Richard B. Owen.

ATTORNEY

T. E. BRAZEAL.
FLUID PRESSURE CIRCUIT CLOSER.
APPLICATION FILED NOV. 27, 1916.
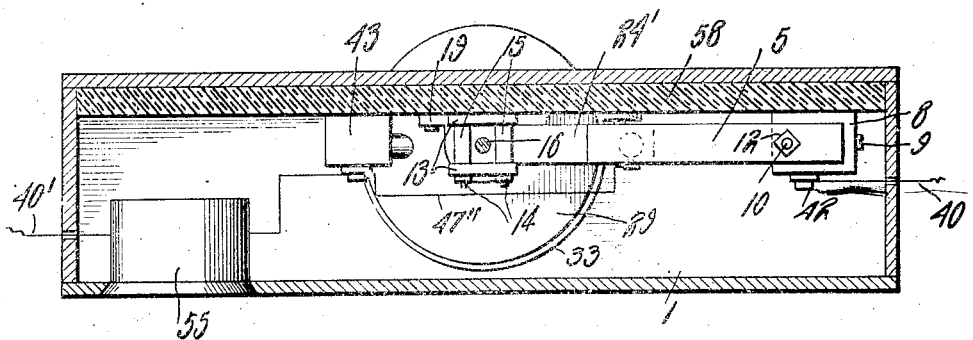
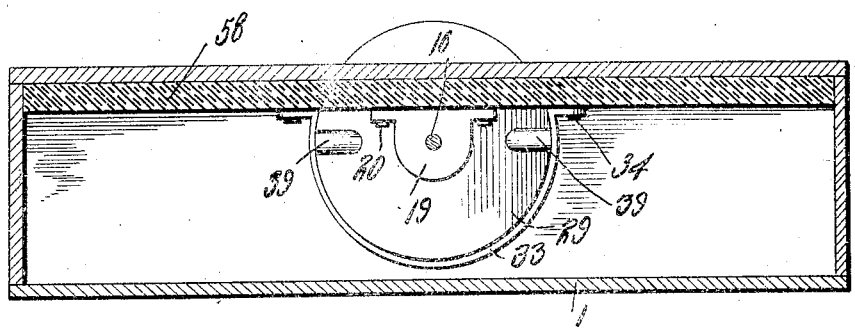
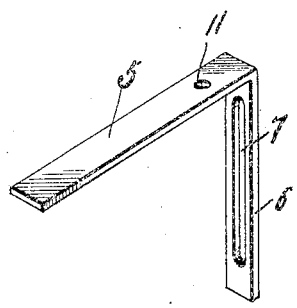

UNITED STATES PATENT OFFICE.

THOMAS E. BRAZEAL, OF MAITLAND, WEST VIRGINIA.

FLUID-PRESSURE CIRCUIT-CLOSER.

1,338,896.  Specification of Letters Patent.  Patented May 4, 1920.

Application filed November 27, 1916. Serial No. 133,767.

*To all whom it may concern:*

Be it known that I, THOMAS E. BRAZEAL, a citizen of the United States, residing at Maitland, in the county of McDowell and State of West Virginia, have invented certain new and useful Improvements in Fluid-Pressure Circuit-Closers, of which the following is a specification.

The present invention has reference, generally, to improvements in signals; and, the invention relates, more particularly, to a safety mine signal.

The invention has for its principal object to provide a signal for use in mines and other similar places where forced ventilation systems are necessary and is adapted should the air forcing apparatus of the ventilator system become broken, or exceed the required velocity, to alarm the miners or workmen, thus, allowing them to escape to the open before casualties result, either from the condition of the air or from the accumulation of gases; the latter frequently causing explosions of serious nature.

As an object of equal importance the invention aims to provide a novel automatic electric circuit closing means that will be closed when the air forcing apparatus of the ventilating system is disabled or exceeds the required speed consequently producing an excessive pressure, thus, completing a circuit through various warning signals, and allowing the workmen ample time to leave the locality in safety.

It is a further object of the present invention to provide an automatic circuit closing means which will operate a plurality of signals, certain of which indicate slight or minor disabilities of the air forcing apparatus and others to indicate material or dangerous disabilities of the said apparatus or conditions arising therefrom.

Among other aims and objects of the invention may be recited the provision of an automatic circuit closing means with a view to compactness, and in which the number of parts are few, the construction simple, the cost of production, installation and maintenance small, and efficiency and operation high.

The improvements in the details and arrangements of parts will be apparent from an inspection of the accompanying drawings, in connection with the specific description hereinafter contained, and wherein the preferred embodiment of the invention is disclosed for the purpose of imparting a full understanding of the invention.

In the drawings:

Figure 1 is a combined vertical section of the automatic circuit closing means and semi-diagrammatic view of the several signaling circuits, Fig. 2 is a horizontal section taken on the line 2—2 of Fig. 1, Fig. 3 is a similar section taken on the line 3—3 of Fig. 1, and Fig. 4 is a detail in perspective of one of the fixed contact terminals.

Referring more specifically to the drawings, wherein like reference characters designate corresponding parts in the several views, reference will be first had to the improved automatic circuit closing means, which means includes a housing 1, the same having openings 2 and 3 arranged in the top and bottom thereof. Other openings 4 and 4′ are arranged in side walls of the housing. A plurality of pairs of contact terminals are arranged within the housing 1 and are designated generally at 5. It will be noted, that the several pairs of contact terminals are arranged in vertically alined position, that is, one above the other. The contact terminals 5 comprise arms that are bent at substantially right angles to the body portions, as at 6. The terminals are provided with the longitudinal elongated slots 7, so that the arms may be slidably received within complemental ways formed in the fixed insulating supporting blocks 8, the terminal arms are held in proper position by means of the set screws 9 that are brought into engagement with the said blocks. The said screws are passed through the elongated slots 7 of the angular portions 6 of the contact terminals. The body portions of the contact terminals are arranged in oppositely disposed relation and in order that the same may be adjusted to or from each other, they are provided with screw threaded shanks 10. These shanks are passed through the openings 11 formed in the body portions thereof and are adapted to have the locking nuts 12 placed thereon. The locking nuts are adapted to be turned into engagement with the opposite faces of the body portions of the contact terminals, thus, allowing the same to be readily adjusted by merely moving the locking nuts 12 to various positions upon the screw threaded shanks 10. This will permit the desired adjustment of said contact terminals.

In order to provide movable contact elements whereby the fixed contact terminals 5 may be engaged and a circuit completed, a bracket comprising a plurality of vertically disposed spaced apart strips of insulation 13 are affixed to one wall of the housing 1 by means of bolts 14. These bolts are passed through suitable spacing blocks 15 that are placed between the strips 13 and are then embedded in the wall of the housing. Obviously, by so arranging the strips of insulation 13, a vertical guide way is afforded. In this guide way there is slidably disposed a vertical rod 16, the upper extremity of which is screw threaded, as at 17. This rod passes through the opening 3 formed in the top of the housing, and, nuts 18 are turned into proximity to the lower portion of the screw threads 17. The bearing brackets 19 are then arranged thereover and secured to the adjacent wall of the housing 1 by suitable fastening devices 20. Previous to the securing of the upper bearing bracket 19 in a fixed position, an expansible coiled spring is arranged about the lower part of the screw threads 17 of the rod 16. The lower end of the spring rests upon the uppermost nut 18, while the upper end bears against the lower face of the bracket bearing 19. When the bracket is secured to the housing 1, a second expansible coiled spring 22 is arranged over the upper screw threaded part of the rod 16 and has its upper end bearing against the lowermost of nuts 23. By this means, it will be appreciated, that an efficient equalizing means is afforded, since, by adjusting either the nuts 18 or 23, the tension upon the springs 21 and 22 may be varied, consequently, enabling the rod 16 to more freely move in a predetermined direction.

Laterally extended squared arms 24 and 24' formed of porcelain or other similar insulating material are arranged upon the rod 16, which element is received through suitable openings arranged adjacent one end of each of the arms 24 and 24'. Set screws or the like 25 are then turned into engagement with the said arms and bear upon the rod 16, thus, retaining the arms in a fixed position. The outer ends of the arms 24 and 24' are disposed between the contact terminal 5 and have vertical bores herein into which are inserted the bushings or bearing sleeves 26. Each sleeve is adapted to slidably receive a double headed contact pin 27. To retain the contact pins within the respective sleeves of the arms 24 and 24', the coiled springs 28 are placed on the projecting portions of the face. These springs have their inner ends bearing upon the opposite sides of the said arms, while their remaining ends are in engagement with the under faces of the heads of the pins. Thus, it is evident that when the pin is engaged with either of the contact terminals, between which it is arranged, it will by reason of its yieldable mounting afford a positive connection. Upon sliding movement of the rod 16, the arms 24 and 24' with their respective contact pins 27 will be moved therewith. Lateral or rotary movement of the arms will be prevented by the mounting of the same in the guide way formed by the spaced apart vertical strips 13.

A pressure cylinder 29 is arranged upon the bottom of the housing 1 and is provided in its bottom with a neck 30, which neck is received by the opening 2 in the bottom of the housing and is engaged by a screw threaded connection 31 of the air forcing apparatus supply pipe 32. Semicircular brackets 33 are passed about the peripheral surface of the pressure cylinder 29 and have the feet thereof secured to one wall of the housing, as at 34, thus, rendering the cylinder immovable and preventing disalinement of the same with the rod 16. A floating piston 35 is loosely arranged within the pressure cylinder 29 and carries a depending guide rod 36 adapted to be received in a portion of the supply pipe 32, and a piston rod 37, which rod, is connected to the lower end of the slidable rod 16 by means of a suitable coupling 38. Exhaust ports 39 are arranged within the upper or exhaust end of the pressure cylinder 29 and as will be obvious, permit the exhaustion of fluid therefrom and consequently the moving of the piston 35. Since the pipe 32 is connected with the air forcing apparatus of the ventilating system, which usually comprises a blower of suitable construction, it is evident, that a portion of the air current will be shunted therethrough into the cylinder 29, thus, supporting the piston 35 in a predetermined position, whereby, the contact pins 27 as carried upon the arms 24 and 24' will be maintained in spaced relation from their respective contact terminals 5. However, should the pressure within the cylinder 29 decrease, due to disabling of the blower or fracture or clogging of the air conveying apparatus of the ventilating system, the piston 35 will be permitted to lower and thereby, bring the lower portions of the contact pins 27 into engagement with the lower contact terminals 5, whereupon, signaling circuits, which will be subsequently described, will be closed, and the miners or other workmen warned in order that they may escape to the open. Should for any reason the speed or velocity of the blower exceed the required point and the air pressure be increased, the piston will be raised within the pressure cylinder and consequently, the upper portions of the contact pins 27 will be engaged with their respective contact terminals, again closing the signaling circuits and warning the workmen.

Referring now to the signaling means, an electric circuit comprising conductors 40 and 40' is connected to the opposite pole of a storage battery 41 or other source of continuous current, whereupon, the free end of the conductor 40 is passed through one of the openings 4 in one side wall of the housing and connected to the terminal of the supporting block 8, as at 42, while the free end of the conductor 40' is passed through one of the openings 4' in the remaining side wall of the housing 1 and secured to a supporting block 43. From this block the conductor 47'' is connected with the contact pin 27, as at 44. A bell 45 is interposed in the said circuit and obviously, is energized by the same upon contact of its contact pin 27 with either of the adjacent terminals 5. To control the passage of current through the conductors 40 and 40', a single point switch 46 may be and preferably is arranged therein. The electrical circuit as formed by the conductors 40 and 40', provides for means whereby the ventilation engineer will be notified of slight or minor disabilities as may be existing in the ventilating system, in order that the proper repairs may be immediately made. A second or danger indicating circuit is provided and comprises conductors 47 and 47', certain of the ends of which are engaged with the supply of current from the storage battery 41 while the remaining ends thereof are passed through a second opening 4 in one side wall of the housing 1 and engaged with the terminal of the second supporting block 8, as at 48 and through the second opening 4' in the other side of the housing 1 and engaged with a pivotal circuit closing trip 49. A branch conductor 47''' is connected to a second pivotal circuit closing trip 50, arranged in proximity of and adapted to be engaged by the trip 49 and is then extended into engagement with the terminal or binding post of a supporting block 51 from whence it is extended into engagement with the second contact pin 27 carried by the arm 24, as at 52. By this arrangement, when the said second contact pin 27 is engaged with either of its respective contact terminals 5 and the pivotal circuit closing trips 49 and 50 are engaged, a circuit will be completed, whereby, a plurality of danger indicating lamps 53 and a bell or other audible signal 54 will be operated, thereby, warning the workmen and allowing them sufficient time to gain places of safety.

To operate the circuit closing trips 49 and 50, there is provided an electrically operated clock 55 having a single rotatable hand 56, which hand carries a tripping finger 57, whereby, the upper portion or heel of the trip 49 will be forced downwardly when engaged thereby and the remaining end thereof engaged with the trip 50. Means are arranged upon the pivotal support of the pin 50 to limit movement thereof and thus, permit adjusting of the same to various positions whereat it may be engaged by the trip 49. Various means may be employed for starting the clock 55 when abnormal conditions are present in the ventilating system, such as electro-magnetically actuated means which are adapted to be energized upon contact of the pin 27 carried by the arm 24 with its respective terminals. However, inasmuch as the specific construction of clock or of operating means therefor forms no part of my invention, it is to be understood that the invention is not to be limited to any one form but that many forms of construction may be used such as conditions or preference may dictate.

The operation of the construction may be reviewed as follows:

The upper and lower pairs of contact terminals 5 are so adjusted as to permit the engaging of the contact pin 27 as arranged between the upper contact terminals with the same prior to the engagement of the remaining pin 27 with its respective contact terminals. Thus, upon slight fluctuation of air pressure in the cylinder 29, caused by minor disabilities as occurring in the ventilating system, the circuit including the conductors 40 and 40' will be closed by contact of the pin 27 with the upper pair of contact terminals and the bell 45 operated, thereby, notifying the attendant. However, should the pressure in the cylinder 29 materially fluctuate, the contact pin as carried upon the arm 24 will be engaged with one of the lower pairs of contact terminals 5 and the danger signaling circuit, including the conductors 47, 47' and 47''' will be closed by means of the clock 55 and the signals 53 and 54 operated, thus, warning the workmen and permitting them to escape in safety. Should it be desired to change the pressure upon the slidable rod 16, by varying the tension of the springs 21 and 22, so that the same will move more freely in a certain direction, the bearing nuts 18 and 23 as associated with the said spring will be adjusted to the desired extent. By so doing, the piston 35 as arranged within the pressure cylinder 29 may be adjusted so as to accommodate systems of high or low pressure.

To insure insulation of the various parts of the automatic circuit closing means from the housing 1, an insulating supporting slab 58 may be arranged upon the particular walls upon which the said means is supported, the same being secured thereto by rivets or the like designated by the numeral 59, which, are engaged with the said wall of the housing.

While I have herein illustrated and described with a considerable degree of particularity constructional details of the device embodying my invention I do not wish to be understood as confining the same to this particular embodiment nor to the exact construction, arrangement and adaptation of the parts shown and described, but I reserve the right to make any changes and alterations that fairly fall within the spirit and scope of the invention.

I claim:

1. A circuit closer comprising in combination with an air cylinder having an air inlet, a piston operable in the cylinder, a rod secured to the piston and extending through the end of the cylinder, an arm secured to the rod, a vertically slidable pin extending through the end of the arm, a block secured adjacent the rod, said block having vertically extending passageways therein, spaced adjustable contacts carried by the block and adapted to be engaged by the pin for closing a circuit, said contacts having right angle extensions received in the passageways, means for holding the right angle extensions in adjusted position in the passageways, threaded rods secured to the blocks and adapted to extend through the contacts, and means carried by the threaded rods for adjusting the contacts.

2. A circuit closer comprising in combination with an air cylinder having an air inlet, a piston operable in the cylinder, a rod secured to the piston and extending through the end of the cylinder, an arm secured to the rod, a slidable pin extending through the end of the arm and provided with an enlarged head on each end, a coil spring surrounding the pin on each side of the arm and engaging the enlarged heads on the ends of the pin, a block secured adjacent the rod, spaced adjustable contacts carried by the block and adapted to be engaged by the slidable pin for closing a circuit, threaded rods secured to the block and adapted to extend through the contacts, and means carried by the threaded rods for adjusting the contacts.

In testimony whereof I affix my signature in presence of two witnesses.

THOMAS E. BRAZEAL.

Witnesses:
 H. R. SIXTON,
 H. P. CARRINGTON.